United States Patent
Koziol et al.

(10) Patent No.: US 9,755,703 B2
(45) Date of Patent: *Sep. 5, 2017

(54) CLOUD-BASED SYSTEM FOR PROCESSING OF DECODABLE INDICIA

(71) Applicant: Honeywell International, Inc., Fort Mill, SC (US)

(72) Inventors: Thomas Koziol, Camillus, NY (US); Daniel Yeakley, Monroe, NC (US); Erik Todeschini, Camillus, NY (US); Stephen Patrick Deloge, Palmyra, NY (US); Benjamin Hejl, Cherry Hill, NJ (US)

(73) Assignee: Honeywell International, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,370

(22) Filed: Jul. 24, 2015

(65) Prior Publication Data

US 2015/0333803 A1    Nov. 19, 2015

Related U.S. Application Data

(63) Continuation of application No. 13/545,454, filed on Jul. 10, 2012, now Pat. No. 9,092,683.

(51) Int. Cl.
*G06K 7/00* (2006.01)
*H04B 5/00* (2006.01)
(Continued)

(52) U.S. Cl.
CPC .......... *H04B 5/0062* (2013.01); *G06K 7/0004* (2013.01); *G06K 7/10851* (2013.01); *G06K 7/1443* (2013.01); *G06K 7/1495* (2013.01)

(58) Field of Classification Search
CPC ............ G06K 7/0004; G06K 7/10851; G06K 7/1443; G06K 7/1495
(Continued)

(56) References Cited

U.S. PATENT DOCUMENTS 6,659,344 B2   12/2003   Otto et al.
7,003,138 B2    2/2006   Wilson
(Continued)

OTHER PUBLICATIONS

EPC Global, Specification for RFID Air Interface, EPC Radio-Frequency Identitity Portocols Class-1 Gerneration-2 UHF RFID Protocol for Communications at 860 MHx-960 MHz, Version 1.0.9, Jan. 31, 2005, pp. 1-94 (Copy previously provided in parent application).

*Primary Examiner* — Seung Lee
(74) *Attorney, Agent, or Firm* — Additon, Higgins & Pendleton, P.A.

(57) ABSTRACT

A data decoding system can comprise a client computer including an imaging device and one or more servers executing at least one decoding process. The client computer can be configured to acquire an image of decodable indicia and to process the acquired image by:

(i) identifying one or more areas of interest within the image;
(ii) cropping the image based on the identified areas of interest;
(iii) clipping one or more images from the image based on the identified areas of interest;
(iv) increasing or reducing a pixel resolution of at least part of the image;
(v) converting the image to a grayscale image or to a monochrome image; and/or
(vi) compressing the image using a compression algorithm.

(Continued)

The decoding process can be configured, responsive to receiving a decoding request comprising the processed image, to decode the decodable indicia and to transmit the decoding operation result to the client computer.

19 Claims, 5 Drawing Sheets

(51) Int. Cl.
    *G06K 7/14* (2006.01)
    *G06K 7/10* (2006.01)

(58) Field of Classification Search
    USPC .......... 235/383, 385, 462.01, 472.01–472.03
    See application file for complete search history.

(56) References Cited

U.S. PATENT DOCUMENTS

| | | | |
|---|---|---|---|
| 7,015,967 B1 | 3/2006 | Kochi et al. | |
| 7,110,666 B2 * | 9/2006 | Abe | H04N 1/00925 348/E7.085 |
| 7,159,770 B2 | 1/2007 | Onozu | |
| 7,237,721 B2 | 7/2007 | Bilcu et al. | |
| 7,287,696 B2 | 10/2007 | Attia et al. | |
| 7,308,158 B2 | 12/2007 | Herbert et al. | |
| 7,405,662 B2 | 7/2008 | Steinke et al. | |
| 7,407,096 B2 | 8/2008 | McQueen et al. | |
| 7,419,097 B2 | 9/2008 | Lee et al. | |
| 7,480,737 B2 | 1/2009 | Chauffour et al. | |
| 7,494,063 B2 | 2/2009 | Kotlarsky et al. | |
| 7,501,950 B2 | 3/2009 | Suzuki | |
| 7,535,361 B2 | 5/2009 | Doan et al. | |
| 7,551,090 B2 | 6/2009 | Doan et al. | |
| 7,602,288 B2 | 10/2009 | Broussard | |
| 7,627,191 B2 | 12/2009 | Xu et al. | |
| 7,677,602 B2 | 3/2010 | Bennett et al. | |
| 7,696,874 B2 | 4/2010 | Stevens | |
| 7,702,187 B2 | 4/2010 | Rusman et al. | |
| 7,708,205 B2 | 5/2010 | Kotlarsky et al. | |
| 7,735,731 B2 | 6/2010 | Skaaksrud et al. | |
| 7,756,292 B2 | 7/2010 | Lev | |
| 7,756,319 B2 | 7/2010 | Odell | |
| 7,786,865 B2 | 8/2010 | Park | |
| 7,786,925 B1 | 8/2010 | Knibbe et al. | |
| 7,810,729 B2 * | 10/2010 | Morley, Jr. | 235/435 |
| 7,815,121 B2 | 10/2010 | Kotlarsky et al. | |
| 7,821,400 B2 | 10/2010 | Tabet et al. | |
| 7,831,082 B2 | 11/2010 | Holsing et al. | |
| 7,831,912 B2 | 11/2010 | King et al. | |
| 7,855,643 B2 | 12/2010 | Tuttle | |
| 7,861,936 B2 | 1/2011 | Kotlarsky et al. | |
| 7,870,999 B2 | 1/2011 | Skaaksrud et al. | |
| 7,883,013 B2 | 2/2011 | Skaaksrud et al. | |
| 7,886,972 B2 | 2/2011 | Skaaksrud et al. | |
| 7,950,698 B2 | 5/2011 | Popadic et al. | |
| 7,951,003 B2 | 5/2011 | Russell et al. | |
| 7,957,765 B1 * | 6/2011 | Causey | H04M 1/0256 455/550.1 |
| 7,961,908 B2 | 6/2011 | Tzur et al. | |
| 7,965,186 B2 | 6/2011 | Downie et al. | |
| 7,988,050 B2 | 8/2011 | Kitada et al. | |
| 8,046,311 B2 | 10/2011 | Ferraro et al. | |
| 8,079,525 B1 | 12/2011 | Zolotov | |
| 8,087,583 B2 | 1/2012 | Hawes | |
| 8,115,601 B2 | 2/2012 | Nonaka | |
| 8,120,818 B2 | 2/2012 | Nagata | |
| 8,139,117 B2 | 3/2012 | Dwinell et al. | |
| 8,139,249 B2 | 3/2012 | Venable | |
| 8,149,094 B2 | 4/2012 | Deoalikar et al. | |
| 8,256,664 B1 | 9/2012 | Balfanz et al. | |
| 8,366,005 B2 | 2/2013 | Kotlarsky et al. | |
| 8,485,430 B2 | 7/2013 | Qu et al. | |
| 9,092,683 B2 | 7/2015 | Koziol et al. | |
| 2001/0047426 A1 | 11/2001 | Hunter | |
| 2002/0165758 A1 | 11/2002 | Hind et al. | |
| 2005/0082370 A1 | 4/2005 | Frantz et al. | |
| 2005/0212817 A1 | 9/2005 | Cannon et al. | |
| 2006/0262961 A1 | 11/2006 | Holsing et al. | |
| 2006/0266836 A1 | 11/2006 | Bilcu et al. | |
| 2007/0008136 A1 | 1/2007 | Suzuki | |
| 2007/0102506 A1 | 5/2007 | Stevens | |
| 2007/0199995 A1 | 8/2007 | Kotlarsky et al. | |
| 2007/0215706 A1 | 9/2007 | Kotlarsky et al. | |
| 2008/0011837 A1 * | 1/2008 | Wesley | G06Q 20/20 235/383 |
| 2008/0037899 A1 | 2/2008 | Xu et al. | |
| 2008/0061937 A1 | 3/2008 | Park | |
| 2008/0111661 A1 | 5/2008 | Lin et al. | |
| 2008/0164313 A1 | 7/2008 | Kotlarsky et al. | |
| 2008/0164317 A1 | 7/2008 | Kotlarsky et al. | |
| 2008/0169343 A1 | 7/2008 | Skaaksrud et al. | |
| 2008/0172303 A1 | 7/2008 | Skaaksrud et al. | |
| 2008/0173706 A1 | 7/2008 | Skaaksrud et al. | |
| 2008/0173710 A1 | 7/2008 | Skaaksrud et al. | |
| 2008/0203147 A1 | 8/2008 | Skaaksrud et al. | |
| 2008/0203166 A1 | 8/2008 | Skaaksrud et al. | |
| 2008/0210749 A1 | 9/2008 | Skaaksrud et al. | |
| 2008/0210750 A1 | 9/2008 | Skaaksrud et al. | |
| 2008/0224870 A1 | 9/2008 | Yeo et al. | |
| 2008/0247363 A1 | 10/2008 | Lee et al. | |
| 2008/0285091 A1 | 11/2008 | Skaaksrud et al. | |
| 2009/0021353 A1 | 1/2009 | Nanaka | |
| 2009/0040025 A1 | 2/2009 | Volpi et al. | |
| 2009/0045913 A1 | 2/2009 | Nelson et al. | |
| 2009/0045924 A1 | 2/2009 | Roberts, Sr. et al. | |
| 2009/0109484 A1 | 4/2009 | Honda | |
| 2009/0121025 A1 | 5/2009 | Romanchik | |
| 2009/0161964 A1 | 6/2009 | Tzur et al. | |
| 2009/0190183 A1 | 7/2009 | Hosoda | |
| 2009/0214137 A1 | 8/2009 | Takahashi | |
| 2009/0218405 A1 | 9/2009 | Joseph et al. | |
| 2009/0243801 A1 | 10/2009 | Strzelczyk | |
| 2009/0245755 A1 | 10/2009 | Lee et al. | |
| 2009/0300106 A1 | 12/2009 | Woodside et al. | |
| 2009/0307232 A1 | 12/2009 | Hall | |
| 2009/0322537 A1 | 12/2009 | Tapp et al. | |
| 2010/0010984 A1 | 1/2010 | Matias | |
| 2010/0045436 A1 | 2/2010 | Rinkes | |
| 2010/0046842 A1 | 2/2010 | Conwell | |
| 2010/0048242 A1 | 2/2010 | Rhoads et al. | |
| 2010/0072269 A1 | 3/2010 | Scott et al. | |
| 2010/0073487 A1 | 3/2010 | Sogoh et al. | |
| 2010/0084470 A1 | 4/2010 | Scott et al. | |
| 2010/0091313 A1 | 4/2010 | Kitada et al. | |
| 2010/0109903 A1 | 5/2010 | Carrick | |
| 2010/0142825 A1 | 6/2010 | Maxwell et al. | |
| 2010/0148985 A1 | 6/2010 | Lin et al. | |
| 2010/0163632 A1 | 7/2010 | Tseng et al. | |
| 2010/0187311 A1 | 7/2010 | Van Der Merwe et al. | |
| 2010/0189367 A1 | 7/2010 | Van Der Merwe et al. | |
| 2010/0200660 A1 | 8/2010 | Moed et al. | |
| 2010/0201488 A1 | 8/2010 | Stern et al. | |
| 2010/0201520 A1 | 8/2010 | Stern et al. | |
| 2010/0220894 A1 | 9/2010 | Ackley et al. | |
| 2010/0226530 A1 | 9/2010 | Lev | |
| 2010/0232712 A1 | 9/2010 | Tomita et al. | |
| 2010/0250351 A1 | 9/2010 | Gillenson et al. | |
| 2010/0250356 A1 | 9/2010 | Gillenson et al. | |
| 2010/0250359 A1 | 9/2010 | Gillenson et al. | |
| 2010/0252621 A1 | 10/2010 | Ito et al. | |
| 2010/0260426 A1 | 10/2010 | Huang et al. | |
| 2010/0271187 A1 | 10/2010 | Uysal et al. | |
| 2010/0296753 A1 | 11/2010 | Ito et al. | |
| 2010/0303348 A1 | 12/2010 | Tolliver et al. | |
| 2010/0308964 A1 | 12/2010 | Ackley et al. | |
| 2010/0327066 A1 | 12/2010 | Khan | |
| 2011/0000958 A1 | 1/2011 | Herzig | |
| 2011/0011936 A1 | 1/2011 | Morandi et al. | |
| 2011/0019220 A1 | 1/2011 | Kikuchi | |
| 2011/0019816 A1 | 1/2011 | Inami et al. | |
| 2011/0026081 A1 | 2/2011 | Hamada et al. | |
| 2011/0029363 A1 | 2/2011 | Gillenson et al. | |

(56) References Cited

U.S. PATENT DOCUMENTS

| | | |
|---|---|---|
| 2011/0034176 A1 | 2/2011 | Lord et al. |
| 2011/0052008 A1 | 3/2011 | Holsing et al. |
| 2011/0081948 A1 | 4/2011 | Shirai et al. |
| 2011/0084808 A1 | 4/2011 | Tuttle |
| 2011/0102642 A1 | 5/2011 | Wang et al. |
| 2011/0115950 A1 | 5/2011 | Wach |
| 2011/0128125 A1 | 6/2011 | Kai et al. |
| 2011/0143811 A1 | 6/2011 | Rodriguez |
| 2011/0155808 A1 | 6/2011 | Santos et al. |
| 2011/0200256 A1 | 8/2011 | Saubat et al. |
| 2011/0205387 A1 | 8/2011 | Tzur et al. |
| 2011/0207531 A1 | 8/2011 | Gagner et al. |
| 2011/0210171 A1 | 9/2011 | Brown et al. |
| 2011/0211726 A1 | 9/2011 | Moed et al. |
| 2011/0212717 A1 | 9/2011 | Rhoads et al. |
| 2011/0222757 A1 | 9/2011 | Yeatman, Jr. et al. |
| 2011/0251093 A1 | 10/2011 | Xia et al. |
| 2011/0280447 A1 | 11/2011 | Conwell |
| 2011/0284625 A1 | 11/2011 | Smith et al. |
| 2011/0310442 A1 | 12/2011 | Popadic et al. |
| 2011/0311026 A1 | 12/2011 | Lalena |
| 2012/0037695 A1 | 2/2012 | Liu et al. |
| 2012/0047424 A1 | 2/2012 | Rothschild |
| 2012/0048920 A1 | 3/2012 | Iizaka |
| 2012/0063690 A1 | 3/2012 | Ashok et al. |
| 2012/0064971 A1 | 3/2012 | Devine et al. |
| 2012/0079544 A1 | 3/2012 | Massimino |
| 2012/0091204 A1 | 4/2012 | Shi |
| 2012/0221724 A1 | 8/2012 | Chor |
| 2013/0142444 A1 | 6/2013 | Qu et al. |
| 2013/0194077 A1 | 8/2013 | Vargas et al. |
| 2013/0277427 A1 | 10/2013 | Zumsteg et al. |
| 2013/0277430 A1 | 10/2013 | Zumsteg et al. |
| 2013/0278386 A1 | 10/2013 | Zumsteg |
| 2013/0278393 A1 | 10/2013 | Zumsteg |
| 2013/0306720 A1 | 11/2013 | Todeschini et al. |
| 2014/0001254 A1 | 1/2014 | Williams et al. |
| 2014/0014724 A1 | 1/2014 | Koziol et al. |

\* cited by examiner

CLOUD-BASED SYSTEM FOR PROCESSING OF DECODABLE INDICIA

CROSS-REFERENCE TO RELATED APPLICATIONS

The present application claims the benefit of U.S. patent application Ser. No. 13/545,454 for a Cloud-Based System for Processing of Decodable Indicia filed Jul. 10, 2012 (and published Jan. 16, 2014 as U.S. Patent Application Publication No. 2014/0014724), now U.S. Pat. No. 9,092,683. Each of the foregoing patent application, patent publication, and patent is hereby incorporated by reference in its entirety.

FIELD OF THE INVENTION

The invention is generally related to systems which process decodable indicia and are specifically related to cloud-based systems for the processing of decodable indicia.

BACKGROUND

Decodable indicia are patterns, marks, or messages which are designed to be scanned and interpreted by computer and/or other mechanical and/or automated methods. Many known types of decodable indicia fall under the category of barcodes. Barcodes are graphical representations of data, the most common of which are referred to as one dimensional (1D) and two dimensional (2D) barcodes. 1D barcodes are graphical entities that represent data by varying the widths and spacing of parallel lines. 2D barcodes are also graphical entities that represent data, but in addition to the parallel lines, or bars, a 2D barcode may contain rectangles, dots, hexagons and other geometric patterns in two dimensions. The data encoded in the barcodes are interpreted by optical scanners and/or software. Barcodes can be scanned by special optical scanners called barcode readers as well as by general purpose devices such as smart phones. Other types of decodable indicia include optical character recognition (OCR), glyphs, or other visual markings. Also, non-visual technologies such as magnetic strips, radio-frequency identification (RFID), biometric, audio and/or speech recognition and other non-visual technologies fall under the definition of decodable indicia as well.

SUMMARY

In one embodiment, there is provided a data decoding system comprising a client computer equipped with an imaging device and one or more servers executing at least one decoding process. The client computer can be configured to acquire an image of decodable indicia and to process the acquired image by performing at least one of:
  (i) identifying one or more areas of interest within the image;
  (ii) cropping the image based on the identified areas of interest;
  (iii) clipping one or more images from the image based on the identified areas of interest;
  (iv) increasing or reducing a pixel resolution of at least part of the image;
  (v) converting the image to a grayscale image or to a monochrome image; and
  (vi) compressing the image using a compression algorithm.

The client computer can be further configured to transmit the processed image to the servers for decoding the decodable indicia. The decoding process can be configured, responsive to receiving a decoding request comprising the image, to decode the decodable indicia into a decoded message, and to transmit the decoding operation result to the client computer.

In another embodiment, there is provided a mobile communication terminal comprising a microprocessor, a memory, and an imaging device configured to acquire an image of decodable indicia. The mobile communication terminal can be configured to pre-process the acquired image by performing at least one of:
  (i) cropping the image based on a configurable setting;
  (ii) identifying one or more areas of interest within the image;
  (iii) clipping one or more images from the image based on the identified areas of interest;
  (iv) increasing or reducing a pixel resolution of at least part of the image;
  (v) converting the image to a grayscale image or to a monochrome image; and
  (vi) compressing the image using a compression algorithm.

The mobile communication terminal can be further configured to transmit the pre-processed image to an external computer for decoding the decodable indicia.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
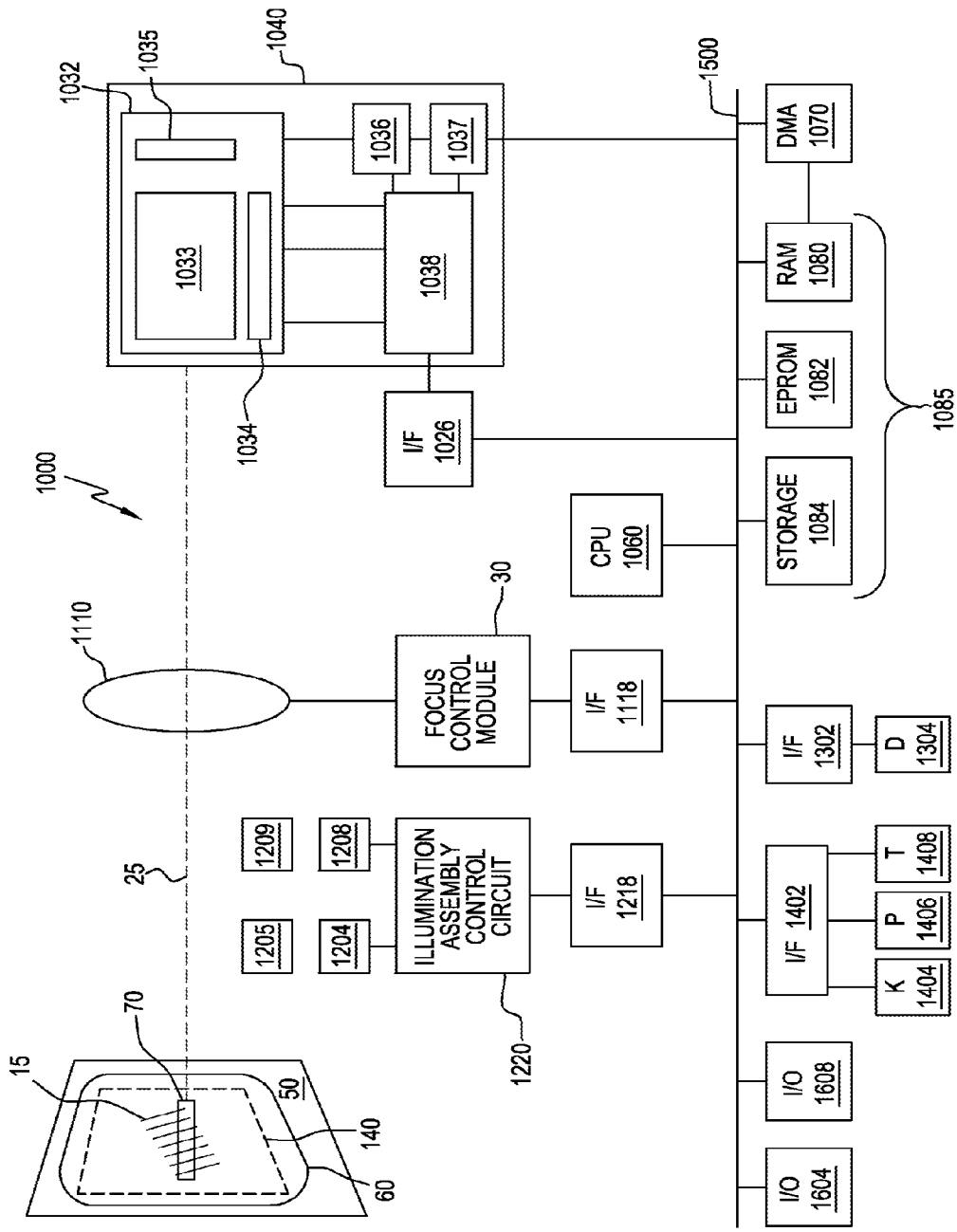
FIG. 1 is a block diagram illustrating an exemplary hardware platform for carrying out a method of acquiring and pre-processing an image by a mobile communication terminal.

Capture of decodable indicia can utilize many types of technologies. Laser scanning or linear imaging can be used for the capture of 1D barcodes. Some 2D barcodes known as stacked codes, such as PDF417, can be read using these technologies as well, however 2D bar codes known as matrix codes require devices which can capture a 2 dimensional (2D) image of the bar code. These 2D images are also useful for decoding 1D, 2D stacked codes, as well as OCR or other visual decodable indicia. For things like RFID, magnetic strips or other non-visual decodable indicia, these may involve use of RF, magnetic reading heads, or other non-visual means of capture. For the purposes of this invention, the capture of any decodable indicia will be referred to generally as "imaging", and the captured representation of the decodable indicia by a device will be referred to as an "image".

A growing variety of devices are currently being used for bar code reading and decoding, ranging from specialized scanners to smart phones. Supporting multiple hardware and software platforms can become challenging for suppliers of decoding software. One solution to supporting a large number of bar code reading devices representing a variety of platforms is to split the imaging and decoding functions: an image comprising decodable indicia can be acquired by a portable or stationary scanner, e.g., by a point-of-sale (POS) device, and can then be transmitted to an external server for decoding. Since the imaging client can be completely agnostic with respect to decoding algorithms employed by the server, the problem of supporting a large variety of client platforms can be solved by creating thin client imaging applications. A typical thin client imaging application only needs to be able to transfer an image of decodable indicia to a decoding server over a network, and then receive decoded message data from the server. As used herein, "message" is intended to denote a character string comprising alphanumeric and/or non-alphanumeric characters. An encoded message can be used to convey information, such as identification of the source and the model of a product, for example, in a UPC code.

In a further aspect, before transmitting the acquired image to a decoding server, the image acquiring device can pre-process the image in order to reduce the bandwidth usage and/or transmission time. In one embodiment, the pre-processing can include defining within the image one or more regions of interest and cropping the acquired image by removing one or more areas of the image located outside of the regions of interest. In another embodiment, the pre-processing can include blurring (i.e., decreasing the pixel resolution) one or more areas of the image located outside of the regions of interest. In another embodiment, the pre-processing can include increasing the pixel resolution of one or more areas of the image located within the regions of interest. In another embodiment, the pre-processing can include clipping one or more images from the acquired image based on the defined regions of interest.

In a further aspect, the regions of interest can be defined by locating one or more decodable indicia within the image, or, alternatively, by accepting a user input (e.g., via a touch screen) indicating the regions of interest.

In a further aspect, the pre-processing can include converting a color image into a grayscale image or converting a color or a grayscale image into a monochrome image.

The pre-processed image can be compressed, for example, by transforming the raw image byte stream to a compressed image file (e.g., GIFF, TIFF, JPEG or other standard or proprietary format).

In one embodiment, there is provided a data decoding system comprising an imaging client computer (provided, e.g., by a portable mobile communication terminal) and one or more decoding server computers communicatively coupled to a communication network. The decoding server computers can execute one or more decoding processes. A "computer" herein shall refer to a programmable device for data processing, including a central processing unit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system. In another embodiment, a computer can be provided by a smartphone. A "communication network" or "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks, i.e., what can be regarded as a single Internet Protocol (IP) network, can include a plurality of different physical networks.

The imaging client computer comprising an integrated and/or peripheral imaging device can acquire an image of decodable indicia (e.g., responsive to a user interface action). Upon successfully acquiring an image, the imaging client can pre-process the acquired image by cropping the image and/or blurring one or more areas of the image, as described in details herein infra. The imaging client computer can then transmit the pre-processed image to a decoding computer executing at least one decoding process. Responsive to receiving from an imaging client a decoding request including a decodable indicia image, the decoding process can decode the decodable indicia into a decoded message and transmit the decoded message and/or decoding operation completion result back to the imaging client.

In another embodiment, there is provided a mobile communication terminal comprising an imaging device capable of acquiring an image of decodable indicia. The mobile communication terminal can be configured to acquire an image of decodable indicia, pre-process the image, and transmit the image via a communication network to an external computer for decoding.

In a further aspect, the pre-processing performed by the mobile communication terminal before transmitting the image for decoding can comprise displaying the acquired image and accepting the user input (e.g., via a touch screen) indicating one or more regions of interest.

In one embodiment, the pre-processing can further include cropping the acquired image by removing one or more areas of the image located outside of the identified regions of interest. In another embodiment, the pre-processing can include blurring (i.e., decreasing the pixel resolution) one or more areas of the image located outside of the regions of interest. In another embodiment, the pre-processing can include increasing the pixel resolution of one or more areas of the image located within the regions of interest. In another embodiment, the pre-processing can include clipping one or more images from the acquired image based on the defined regions of interest.

In a further aspect, the pre-processing can include converting a color image into a grayscale image or converting a color or a grayscale image into a monochrome image.

The pre-processed image can be compressed, for example, by transforming the raw image byte stream to a compressed image file (e.g., GIFF, TIFF, JPEG or other standard or proprietary format).

Upon completing the pre-processing, the mobile communication terminal can transmit one or more pre-processed images to an external computer for decoding, and, responsive to receiving decoding results, can display one or more decoded messages and/or decoding operations completion codes.

An exemplary hardware platform for carrying out the above described image acquiring and pre-processing by a mobile communication terminal is shown and described with reference to the block diagram of FIG. 1. The mobile communication terminal 1000 can include an imaging device 1040 comprising an image sensor 1032. The image sensor 1032 can in turn comprise a multiple pixel image sensor array 1033 having pixels arranged in rows and columns, associated column circuitry 1034, and row circuitry 1035. In one embodiment, the image sensor 1032 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention.

Associated with the image sensor 1032 can be amplifier circuitry 1036 and an analog to digital converter 1037 configured to convert the image information in the form of analog signals read out of image sensor array 1033 into image information in the form of digital signals. The image sensor 1032 can also have an associated timing and control circuit 1038 to control the exposure period of image sensor 1032 and/or gain applied to the amplifier circuitry 1036. The noted circuit components 1032, 1036, 1037, and 1038 can be packaged into a common imaging device 1040.

The mobile communication terminal 1000 can be configured to read out analog signals representative of light incident on one or more pixels. The read out analog signals can be amplified by the analog signal amplifier 1036. The analog signals can then be fed to the input of the ADC 1037. The resulting digital values representative of the analog signals can be stored in a system memory such as RAM 1080. The image frame data stored in RAM 1080 can be in the form of multi-bit pixel values, with each multi-bit pixel value representing light incident on a pixel of image sensor array 1033.

Memory 1085 of terminal 1000 can include RAM 1080, a nonvolatile memory such as EPROM 1082 and a storage memory device 1084 such as may be provided by a flash memory or a hard drive memory.

The mobile communication terminal 1000 can include a direct memory access unit (DMA) 1070 for routing image information read out from image sensor 1032 that has been subject to conversion and storage to RAM 1080. In another embodiment, terminal 1000 can employ a system bus providing for bus arbitration mechanism (e.g., a PCI bus) thus eliminating the need for a central DMA controller. Other embodiments of the system bus architecture and/or direct memory access components providing for efficient data transfer between the image sensor 1032 and RAM 1080 can be provided.

In another aspect, the mobile communication terminal 1000 can include a variable focus imaging lens 1110 for use in focusing an image of a decodable indicia located within a field of view 140 on a substrate 50 onto image sensor array 1033. Imaging light rays can be transmitted about imaging axis 25. Variable focus imaging lens 1110 can be adapted to be capable of multiple best focus distances and multiple focal lengths.

The mobile communication terminal 1000 can also include an illumination pattern light source bank 1204 for use in generating an illumination pattern 60 substantially corresponding to a field of view 140 of terminal 1000 and an aiming pattern light source bank 1208 for use in generating an aiming pattern 70 on substrate 50. Shaping optics 1205 and 1209 can be provided for shaping light from bank 1204 and bank 1208 into pattern 60 and into pattern 70 respectively. In use, terminal 1000 can be oriented by an operator with respect to a substrate 50 bearing decodable indicia 15 in such manner that aiming pattern 70 is projected on a decodable indicia 15. Each of illumination pattern light source bank 1204 and aiming pattern light source bank 1208 can include one or more light sources. Variable focus imaging lens 1110 can be controlled with use of focus control module 30 and the illumination assembly comprising illumination pattern light source bank 1204 and aiming pattern light source bank 1208 can be controlled with use of illumination assembly control module 1220. Focus control module 30 can send signals to variable focus imaging lens 1110 e.g., for changing a best focus distance and/or a focal length of variable focus imaging lens 1110. Illumination assembly control module 1220 can send signals to illumination pattern light source bank 1204 e.g., for changing a level of illumination output by illumination pattern light source bank 1204.

The mobile communication terminal 1000 can also include a number of peripheral devices, e.g., a display 1304 for displaying such information as captured image frames, keyboard 1404, pointing device 1406, and trigger 1408 which may be used to make active a trigger signal for activating frame readout and/or certain decoding processes. The mobile communication terminal 1000 can be adapted so that activation of trigger 1408 activates trigger signal and initiates acquiring an image of decodable indicia.

The mobile communication terminal 1000 can also include various interface circuits for coupling the peripheral devices to system address/data bus (system bus) 1500, for communication with CPU 1060 which can also be coupled to system bus 1500. The mobile communication terminal 1000 can include circuit 1026 for coupling image sensor timing and control circuit 1038 to system bus 1500, interface circuit 1118 for coupling focus control module 30 to system bus 1500, interface circuit 1218 for coupling illumination control assembly 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, the mobile communication terminal 1000 can include one or more I/O interfaces 1604, 1608 for providing communications with external devices (e.g., a decoding server or a peer terminal 100). I/O interfaces 1604, 1608 can be provided by any combination of known network interfaces, e.g., Ethernet (IEEE 802.3), USB, IEEE 802.11, Bluetooth, CDMA, GSM.

In another aspect, the mobile communication terminal 1000 can include CPU 1060 which can be configured to execute one or more software processes. A "process" herein shall refer to an instance of a computer program that is being executed; in some operating systems, several processes can be instantiated simultaneously from the same computer program.

In one embodiment, one or more software processes can be configured to read out image data stored in memory 1080 and perform image pre-processing as described herein supra, transmitting one or more image for remote decoding, or performing local decoding. In one embodiment, at least some of the image pre-processing functions described herein supra can be performed by hardware modules and/or by a combination of hardware modules and software processes.

Figure 2A:
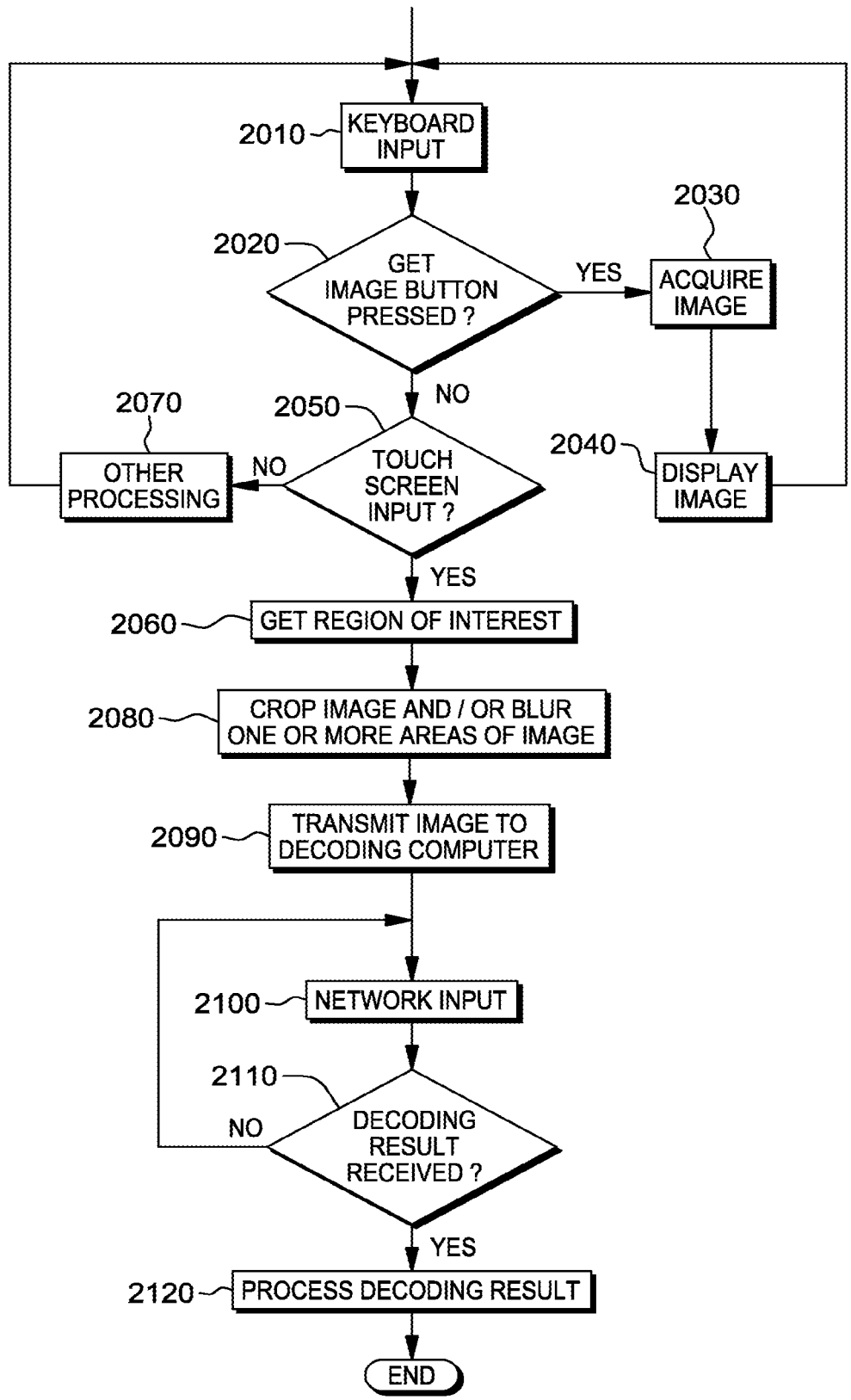
FIGS. 2a and 2b depict flowcharts of various embodiments of a method of acquiring and pre-processing an image by a mobile communication terminal.

FIG. 2a depicts a flowchart of one embodiment of a method of acquiring and pre-processing an image by a mobile communication terminal.

At steps 2010-2020, the mobile communication terminal can perform a GUI input loop, and responsive to establishing at step 2020 that Get Image button has been pressed by the terminal's user, the processing can continue at step 2030; otherwise, the method can branch to step 2050. A skilled artisan would appreciate the fact that other ways of initiating an image acquiring operation are within the scope of this disclosure.

At step 2030, the mobile communication terminal can acquire an image of decodable indicia. The image of decodable indicia acquired by the mobile communication terminal can be provided by a raw image byte stream or a compressed image byte stream (e.g., GIFF, TIFF, JPEG or other standard or proprietary format).

At step 2040, the mobile communication terminal can display the acquired image, and the method can loop back to the GUI input loop at step 2010.

At steps 2050-2060, responsive to detecting a touch screen input, the mobile communication terminal can receive user input defining one or more regions of interest within the displayed image of decodable indicia. Otherwise, the mobile communication terminal can perform other processing at step 2070 and the method can loop back to step 2010.

At step 2080, the mobile communication terminal can crop the image by removing one or more areas of the image located outside of the regions of interest and/or blur (i.e., decrease the pixel resolution) one or more areas of the image located outside of the regions of interest.

At step 2090, the mobile communication terminal can transmit the resulting one or more images to an external computer for decoding.

At steps 2100-2110, the mobile communication terminal can perform a network input loop, and responsive to establishing that a decoding result was received, process the received decoding result at step 2120.

In one embodiment, the decoding result can include one or more decoded messages and/or one or more decoding operation completion codes. The decoding operation completion code can, in one embodiment, contain a flag indicating whether the decoding operation was successful. Responsive to ascertaining that the decoding operation was successful, the mobile communication terminal can be configured to display the decoded message and/or transmit the decoded message to an external computer (e.g., transmitting a retail item identifier to a store server to retrieve the product information).

In one embodiment, the decoding operation completion code can contain an extended error code indicating the reason for the decoding operation failure, for example, failed to locate decodable indicia, decodable indicia symbol truncated, insufficient image resolution, etc. In one embodiment, the mobile communication terminal can be configured to display the error message corresponding to the extended error code.

After processing the decoding result at step 2120, the method can terminate.

Figure 2B:
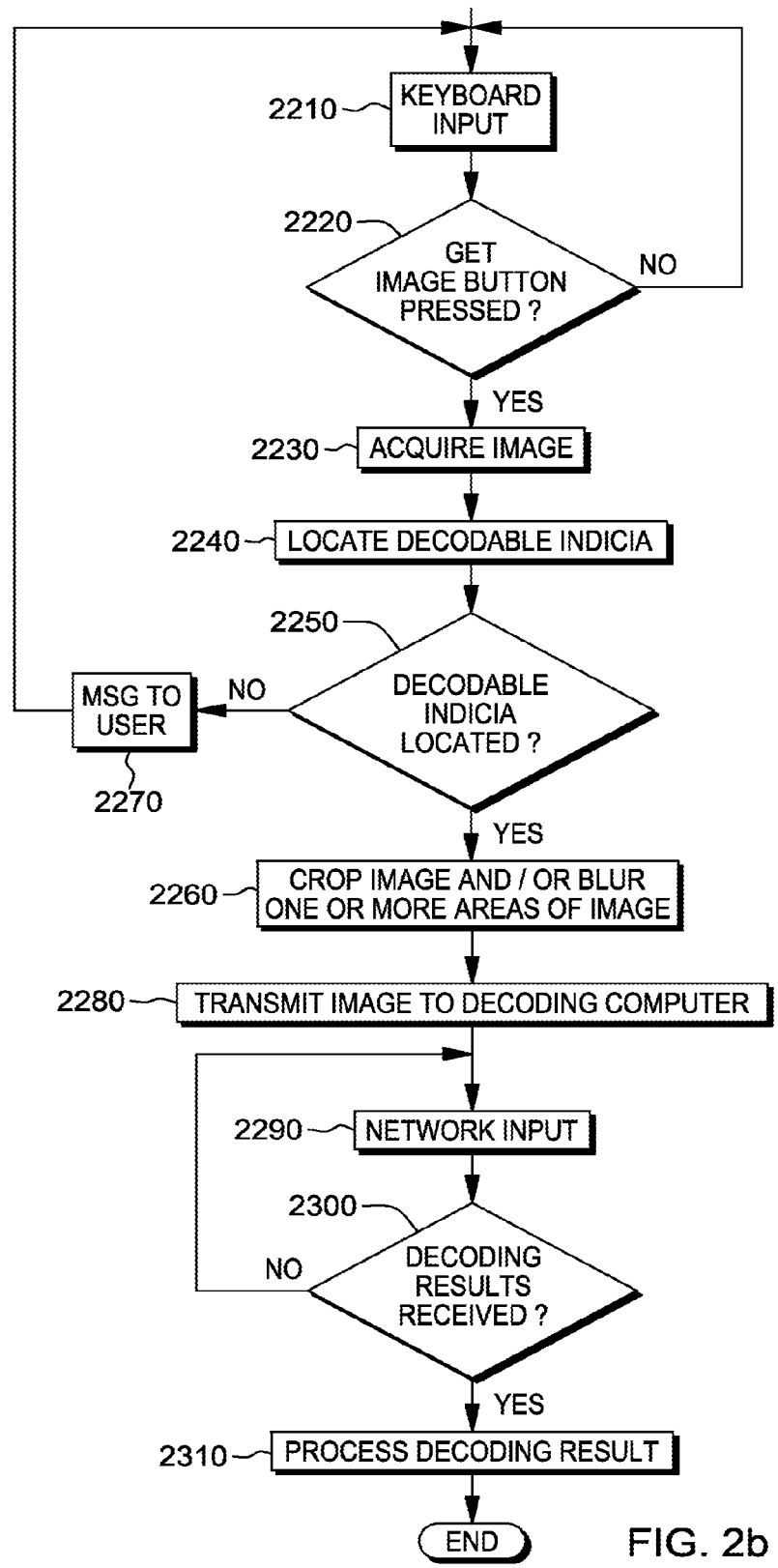

FIG. 2b depicts a flowchart of one embodiment of a method of acquiring and pre-processing an image by a mobile communication terminal.

At steps 2210-2220, the mobile communication terminal can perform a GUI input loop, and responsive to establishing at step 2220 that Get Image button has been pressed by the terminal's user, the processing can continue at step 2230; otherwise, the method can branch to step 2250. A skilled artisan would appreciate the fact that other ways of initiating an image acquiring operation are within the scope of this disclosure.

At step 2230, the mobile communication terminal can acquire an image of decodable indicia. The image of decodable indicia acquired by the mobile communication terminal can be provided by a raw image byte stream or a compressed image byte stream (e.g., GIFF, TIFF, JPEG or other standard or proprietary format).

At step 2240, the mobile communication terminal can locate decodable indicia within the acquired image.

Responsive to ascertaining at step 2250 that decodable indicia has been successfully located within the acquired image, the processing can continue at step 2260; otherwise, at step 2270 the user can be notified of a failure to locate decodable indicia within the acquired image, and the method can loop back to step 2210.

At step 2260, the mobile communication terminal can crop the image by removing one or more areas of the image located outside of the regions of interest and/or blur (i.e., decrease the pixel resolution) one or more areas of the image located outside of the regions of interest.

At step 2280, the mobile communication terminal can transmit the resulting one or more images to an external computer for decoding.

At steps 2290-2300, the mobile communication terminal can perform a network input loop, and responsive to establishing that a decoding result was received, process at step 2310 the received decoding result, as described herein supra. After processing the decoding result at step 2310, the method can terminate.

Figure 3:
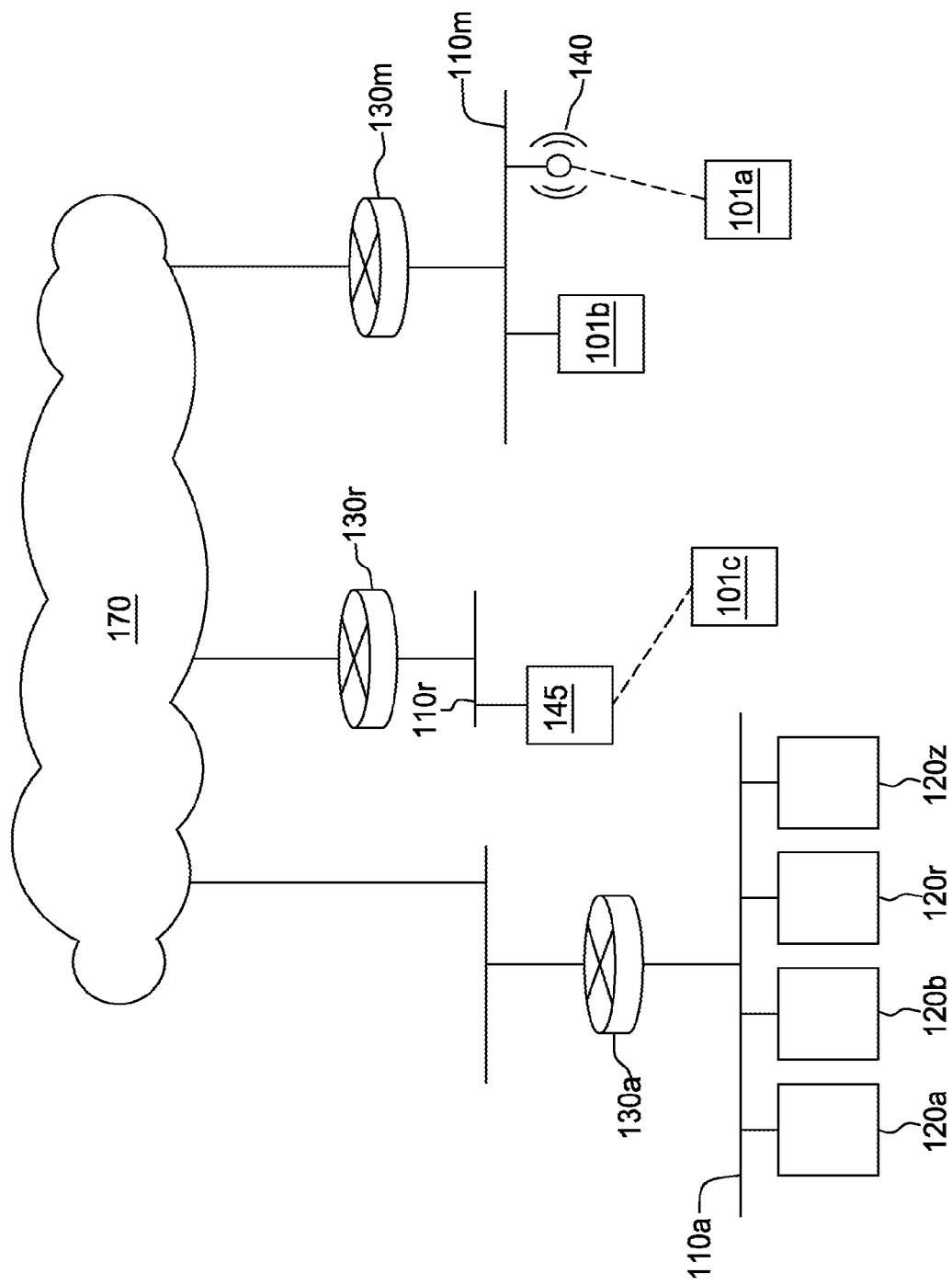
FIG. 3 schematically illustrates a component diagram of one embodiment of a data decoding system.

FIG. 3 schematically illustrates one embodiment of a decoding system described herein. The decoding system 1000 of FIG. 1 can comprise a plurality of computers 120a-120z communicatively coupled to a network 110a. Network 110a can be provided, e.g., by Ethernet-based local area network, and can be communicatively coupled to the Internet 170 via one or more routers 130a-130k and/or one or more networks 110b-110k. An imaging client 101a can be provided by a portable encoded information reading (EIR) terminal communicatively coupled to a local area network 110m via a wireless access point 140. Network 110m can be communicatively coupled to the Internet 170 via one or more routers 130m-130p and/or one or more networks 110m-110p. An imaging client 101b can be provided by a mobile communication terminal mounted into a POS workstation and can be communicatively coupled to the local area network 110m via an Ethernet communication interface. An imaging client 101c can be provided by a smart phone communicatively coupled to a provider's network 110r via a GSM/GPRS base station 145. Network 110r can be communicatively coupled to the Internet 170 via one or more routers 130r-130z and/or one or more networks.

In one embodiment, the decoding system 1000 can follow a cloud computing model, by providing an on-demand network access to a shared pool of configurable computing resources (e.g., servers, storage, applications, and/or services) that can be rapidly provisioned and released with minimal or nor resource management effort, including interaction with the service provider, by the consumer (operator of a thin client). One characteristic of the cloud computing model is that a consumer can unilaterally provision computing capabilities, such as CPU power and storage capacity on the network, as needed automatically without requiring human interaction with the service's provider. The resources of the cloud can be accessed by thin clients over a network.

In another aspect, imaging clients can access cloud-based decoding applications executed by computers 120a-120z via a single point of entry, e.g., via a single IP address or uniform resource identifier (URI). In one embodiment, the single point of entry IP address can be assigned to a load balancing component provided, e.g., by router 130a or by a dedicated load balancer 120r. In another embodiment, the single point of entry URI can include a fully-qualified host name resolvable by a DNS server into one or more IP addresses of computers 120a-120z. In a yet another embodiment, the single point of entry URI can include a fully-qualified host name resolvable by a DNS server into an IP address of the dedicated load balancer 120r which can act as a server-side HTTP proxy by forwarding HTTP requests from the imaging clients 101a-101z to HTTP processes running on the decoding computers 120a-120z. The server-side HTTP proxy can preserve HTTP or application-level sessions by forwarding all TCP packets from one client to the same server. Thus, an imaging client accessing the cloud-based decoding applications can be agnostic with respect to the number of computers 120a-120z, topology of the local area networks 110a-110m, aspects of load balancing among the computers 120a-120z and other server-side implementation details.

For preventing unauthorized access to the cloud-based decoding services, decoding system 1000 can require an imaging client to be authenticated before processing any decoding requests.

In a further aspect, a decoding process can, responsive to completing a decoding operation, to transmit the decoding operation result including decoded message data and/or the decoding operation completion code to the imaging client. The decoding operation completion code can, in one embodiment, contain a flag indicating whether the decoding operation was successful. In another embodiment, the decoding operation completion code can contain the number of decoding attempts performed. In a yet another embodiment, the decoding operation completion code can contain an extended error code indicating the reason for the decoding operation failure, for example, failed to locate decodable indicia, decodable indicia symbol truncated, insufficient image resolution, etc.

In a further aspect, a decoding request transmitted by the imaging client can comprise one or more client configuration parameters, for example, client device model, client device serial number, aperture value, shutter speed, and ISO value. In one embodiment, one or more client configuration parameters (e.g., aperture value, shutter speed, and ISO value) can be used as input parameters for decoding algorithms. In another embodiment, one or more client configuration parameters (e.g., client device serial number) can be used for usage tracking and/or billing purposes.

In another aspect, the imaging client can be provided by a large variety of imaging devices. In one embodiment, the imaging client can be provided by a mobile computing device (e.g., an encoded information reading (EIR) terminal, or a smartphone) comprising an integrated imaging device or a peripheral imaging device. An integrated imaging device can be provided, e.g., by a two-dimensional imager incorporated into the housing of the mobile computing device and communicatively coupled to other components of the mobile computing device, including, e.g., a data bus, a processor or a communication interface. A peripheral imaging device can be provided, e.g., by a still image or video camera disposed in a separate housing and communicatively coupled to the mobile computing device (e.g., via Bluetooth interface).

In another embodiment, the imaging client can be provided by a general purpose computing device (e.g., a notebook computer or a desktop computer) comprising an integrated imaging device or a peripheral imaging device. In a yet another embodiment, the imaging client can be provided by a computing device by a computing device integrated into a POS system (e.g., a retail cashier's workstation) comprising an integrated imaging device or a peripheral imaging device. As noted herein supra, in one embodiment, the imaging client can be provided by an encoded information reading (EIR) terminal.

Figure 4:
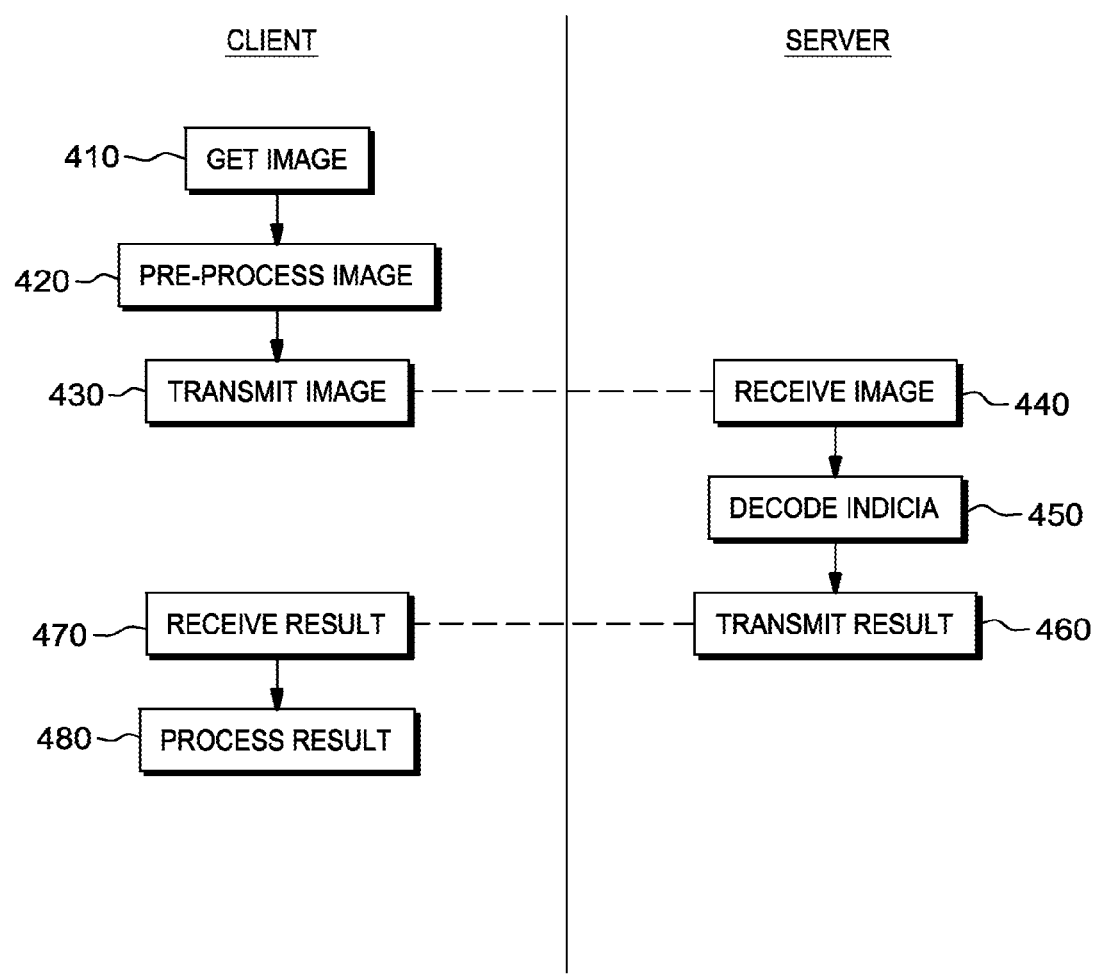
FIG. 4 depicts a flowchart of one embodiment of a method of decodable indicia decoding by the data decoding system.

FIG. 4 depicts a flowchart of one embodiment of a method of decodable indicia decoding by the above described data decoding system.

At step 410, an imaging client can acquire an image containing decodable indicia.

At step 420, the imaging client can pre-process the acquired image. In one embodiment, the pre-processing can include defining within the image one or more regions of interest and cropping the acquired image by removing one or more areas of the image located outside of the regions of interest. In another embodiment, the pre-processing can include blurring (i.e., decreasing a pixel resolution) one or more areas of the image located outside of the regions of interest. In a further aspect, the regions of interest can be defined by locating one or more decodable indicia within the image, or, alternatively, by accepting a user input (e.g., via a touch screen) indicating the regions of interest. The pre-processed image can then be compressed, for example, by transforming the raw image byte stream to a compressed image file (e.g., GIFF, TIFF, JPEG or other standard or proprietary format), as described in details herein supra.

At step 430, the imaging client can transmit the pre-processed image to a decoding server over a communication network.

At steps 440-450, responsive to receiving the image, the decoding server can locate and decode the decodable indicia.

At step 460, the decoding server can transmit the decoding result to the imaging client over a communication network. In one embodiment, the decoding result can include one or more decoded messages and/or one or more decoding operation completion codes. The decoding operation completion code can contain a flag indicating whether the decoding operation was successful. In one embodiment, the decoding operation completion code can contain an extended error code indicating the reason for the decoding operation failure, for example, failed to locate decodable indicia, decodable indicia symbol truncated, insufficient image resolution, etc.

At steps 470-480, responsive to receiving the decoding result the imaging client can process the result, e.g., by displaying the decoded message and/or transmitting the decoded message to an external computer (e.g., transmitting a retail item identifier to a store server to retrieve the product information). After processing the decoding result at step 480, the method can terminate.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparata that are described herein is as follows:

A1. A data decoding system comprising a client computer and one or more servers communicatively coupled to a network, said one or more servers executing at least one decoding process;

wherein said client computer comprises at least one of: an integrated imaging device, a peripheral imaging device;

wherein said client computer is configured to acquire an image of decodable indicia; wherein said client computer is further configured to process said image by performing at least one of:

(i) identifying one or more areas of interest within the image;

(ii) cropping said image based on said one or more areas of interest;

(iii) clipping one or more images from said image based on said one or more areas of interest;

(iv) increasing or reducing a pixel resolution of at least part of said image;

(v) converting said image to a grayscale image;

(vi) converting said image to a monochrome image;

(vii) compressing said image using a compression algorithm;

wherein said client computer is further configured to transmit said processed image to said one or more servers for decoding said decodable indicia;

wherein said at least one decoding process is configured, responsive to receiving a decoding request comprising said image, to decode said decodable indicia into a decoded message; and wherein said at least one decoding process is further configured, responsive to completing a decoding operation, to transmit at least one of: said decoded message, a decoding operation completion code to said client computer.

A2. The data decoding system of (A1), wherein said client computer is provided by an encoded information reading (EIR) terminal comprising an EIR device including a two-dimensional imager, said EIR device configured to perform one of: outputting raw message data containing an encoded message, outputting a decoded message corresponding to an encoded message.

A3. The data decoding system of (A1), wherein said client computer is provided by a mobile computing device comprising at least one of: an integrated imaging device, a peripheral imaging device.

A4. The data decoding system of (A1), wherein said client computer is provided by a general purpose computing device comprising one of: an integrated imaging device, a peripheral imaging device.

A5. The data decoding system of (A1), wherein said client computer is integrated into a point-of-sale system, said client computer comprising at least one of: an integrated imaging device, a peripheral imaging device.

A6. The data decoding system of (A1), wherein said image of decodable indicia is provided by one of: a raw image byte stream, a compressed image byte stream.

A7. The data decoding system of (A1), wherein said decoding request further comprises one or more values of configuration parameters of said client computer.

A8. The data decoding system of (A1), wherein said client computer is configured to transmit said decoding request to an IP address assigned to one of: a server of said one or more servers, a load balancing component.

B1. A mobile communication terminal comprising:
a microprocessor;
a memory;
an imaging device configured to acquire an image of decodable indicia;
wherein said mobile communication terminal is configured to pre-process said image by performing at least one of:

(i) identifying one or more areas of interest within the image;

(ii) cropping said image based on said one or more areas of interest;

(iii) clipping one or more images from said image based on said one or more areas of interest;

(iv) increasing or reducing a pixel resolution of at least part of said image;

(v) converting said image to a grayscale image;

(vi) converting said image to a monochrome image; and (vii) compressing said image using a compression algorithm;

wherein said mobile communication terminal is further configured to transmit said pre-processed image to an external computer for decoding said decodable indicia.

B2. The mobile communication terminal of (B1), wherein said terminal is integrated into a point-of-sale system.

B3. The mobile communication terminal of (B1), wherein said decoding request further comprises one or more values of configuration parameters of said terminal.

B4. The mobile communication terminal of (B1), wherein said image of decodable indicia is provided by one of: a raw image byte stream, a compressed image byte stream.

B5. The mobile communication terminal of (B1), further comprising an encoded information reading (EIR) device selected from the group consisting of: an RFID reading device and a magnetic card reading device;

wherein said EIR device is configured to perform at least one of: outputting raw message data containing an encoded message and outputting decoded message data corresponding to an encoded message.

B6. The mobile communication terminal of (B1), wherein said imaging device comprises a two-dimensional image sensor configured to output an analog signal representative of light reflected by an object located within a field of view of said imaging device, an amplifier configured to output an amplified analog signal by amplifying an analog signal read out of said image sensor, and an analog-to-digital (A/D) converter configured to convert said analog signal into a digital signal representing said acquired image.

B7. The mobile communication terminal of (B1), further configured to transmit an unprocessed image to said external computer responsive to failing to identify at least one area of interest within said image.

B8. The mobile communication terminal of (B1), further configured to omit said step of transmitting said image to said external computer responsive to failing to identify at least one area of interest within said image.

The invention claimed is:

1. A terminal, comprising:
a microprocessor;
a memory;
an imaging device configured for acquiring an image of decodable indicia;
wherein the terminal is configured for:
pre-processing the image of decodable indicia acquired by the imaging device;
transmitting the pre-processed image to a server on a server side of a data decoding system for decoding the decodable indicia;
receiving a decoded message from the server, wherein the decoded message comprises only a source identifier of additional data; and
transmitting the source identifier to an external computer to retrieve additional data from the external computer that is locally connected to the terminal.

2. The terminal of claim 1, wherein the terminal is integrated into a point-of-sale system.

3. The terminal of claim 1, wherein the pre-processed image is transmitted to the server in a decoding request comprising one or more values of configuration parameters of the terminal.

4. The terminal of claim 1, wherein the image of decodable indicia is a raw image byte stream or a compressed image byte stream.

5. The terminal of claim 1, comprising an RFID reading device and/or a magnetic card reading device, wherein the terminal is configured for outputting raw message data containing an encoded message and/or outputting decoded message data corresponding to an encoded message.

6. The terminal of claim 1, wherein the imaging device comprises: a two-dimensional image sensor configured to output an analog signal representative of light reflected by an object located within a field of view of the imaging device; an amplifier configured to output an amplified analog signal by amplifying an analog signal read out of the image sensor; and an analog-to-digital (A/D) converter configured to convert the analog signal into a digital signal representing the acquired image.

7. The terminal of claim 1, wherein the terminal is configured for preprocessing the image of decodable data by identifying one or more regions of interest, wherein if the preprocessing step results in a failure to identify one or more regions of interest, the terminal is further configured to transmit the image to the server.

8. The terminal of claim 1, wherein the terminal is configured for omitting the step of transmitting the image to the server responsive to failing to identify at least one region of interest within the image during the preprocessing step.

9. A server communicatively coupled to a network, wherein:
a client computer is communicatively coupled to the network, the client computer comprises an integrated imaging device and/or a peripheral imaging device, and the client computer is configured to acquire and process an image of a decodable indicia and transmit the processed image to the server;
the server is configured for:
executing at least one decoding process;
while executing the at least one decoding process and responsive to receiving a decoding request comprising an image of a decodable indicia, decoding the decodable indicia into a decoded message; and
while executing the at least one decoding process and responsive to completing a decoding operation, transmitting a decoded message to the client computer, wherein the decoded message comprises only a source identifier that is transmitted by the client computer to an external computer locally connected to the client computer to retrieve additional information corresponding to the source identifier from the external computer.

10. The server of claim 9, wherein the client computer is an encoded information reading (DR) terminal comprising an EIR device including a two-dimensional imager, the EIR device configured to output raw message data containing an encoded message and/or output a decoded message corresponding to an encoded message.

11. The server of claim 9, wherein the client computer is a mobile computing device.

12. The server of claim 9, wherein the client computer is a general purpose computing device.

13. The server of claim 9, wherein the client computer is integrated into a point-of-sale system.

14. The server of claim 9, wherein the image of a decodable indicia in the decoding request is a raw image byte stream and/or a compressed image byte stream.

15. The server of claim 9, wherein the decoding request comprises one or more values of configuration parameters of the client computer.

16. A method for decoding a decodable indicia, the method comprising:
receiving a decoding request from a client computer, the decoding request comprising an image of a decodable indicia;
decoding the decodable indicia in the image; and
transmitting, to the client computer, a decoded message comprising only a source identifier corresponding to the decodable indicia, the source identifier transmitted by the client computer to an external computer locally connected to the client computer to retrieve additional information corresponding to the source identifier from the external computer.

17. The method of claim 16, wherein the client computer is a mobile computing device.

18. The method of claim 16, wherein the client computer is a general purpose computing device.

19. The method of claim 16, wherein the decoding request comprises one or more values of configuration parameters of the client computer.

* * * * *